Oct. 6, 1931.  E. RYDER  1,825,823

SHOCK ABSORBING MECHANISM

Filed Oct. 31, 1927  2 Sheets-Sheet 1

Inventor,
Elmer Ryder,
By his Attorney

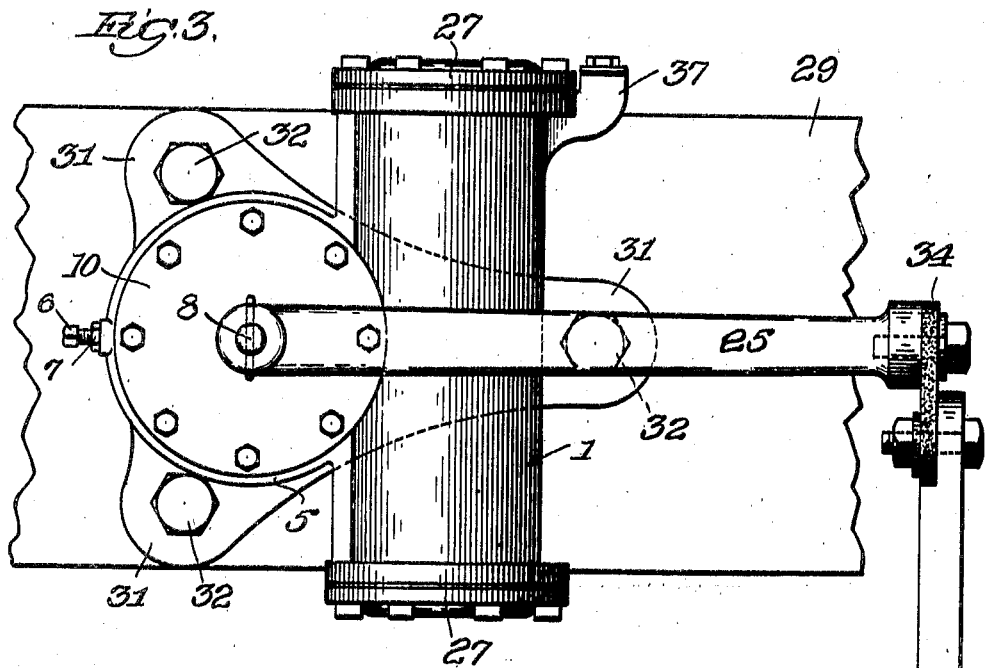
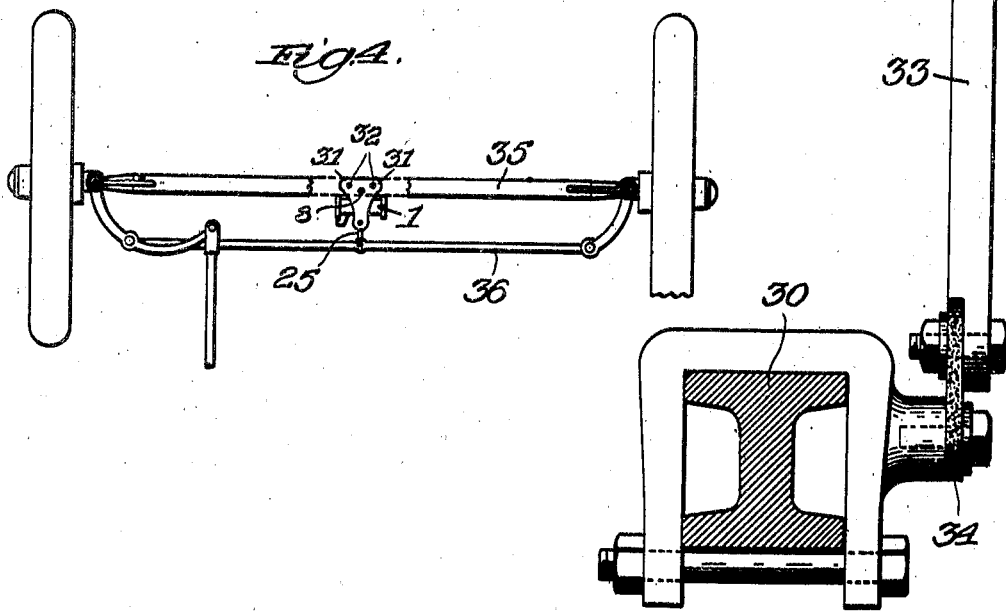

Patented Oct. 6, 1931

1,825,823

UNITED STATES PATENT OFFICE

ELMER RYDER, OF ELGIN, ILLINOIS

SHOCK ABSORBING MECHANISM

Application filed October 31, 1927. Serial No. 229,886.

This invention relates to shock absorbing mechanism adapted for use either in connection with the springs of a motor vehicle or the steering gear to absorb and dampen shocks to which such parts are subjected when in use.

The mechanism contemplated by my invention is double acting, in that it absorbs shocks in either direction, and thus is applicable for use either in connection with the vehicle springs or the steering gear of the vehicle.

One object of my invention is to provide a mechanism in which the hydraulic and friction operating principles are combined so as to absorb and dampen both light and heavy shocks. The hydraulic operating part of the mechanism comprises generally a cylinder containing a liquid, such as oil, and in which cylinder operates a double acting piston, there being a by-pass connection around the piston with means for regulating the flow of liquid through the by-pass so that the device may be set for slow motion and compensate for the usual run of light shocks and jars to which the mechanism is subjected when traveling over a relatively smooth or even roadway.

The friction operating part of the mechanism is in the form of a friction clutch, which may consist of a multiplicity of spring pressed friction discs associated with the piston and slipping with respect to each other under heavy shocks to allow for a quicker movement than could otherwise be obtained by the hydraulic resistance offered to the movement of the piston.

A further object of my invention is to arrange the friction acting part of the mechanism closely adjacent to the hydraulic part so that the heat generated by the slipping of the friction discs will serve to warm the liquid and thus serve to keep the latter in a condition for relatively free flow especially in cold weather.

A further object of my invention is to provide a rigid link or rod to connect the main operating rod of the shock absorbing mechanism with one of the movable elements of the vehicle and to have the opposite ends of the rod or link flexibly connected with this arm or rod, respectively, by means of webbing or other similar material so as to provide a structure which is cheap and economical to make, quick in action, and requires no oiling or other attention after being installed.

A further object of my invention is to provide cushioning means at the opposite ends of the hydraulic cylinder so as to allow the piston when at a central or neutral position in the cylinder to move freely back and forth within limits without making active either the hydraulic or the friction part of the mechanism under the usual run of small vibrations to which the vehicle springs are subjected in the normal travel of the vehicle over a roadway.

The invention consists further in the matters hereinafter described and claimed.

In the accompanying drawings—

Fig. 3 is a side view showing the device employed as a shock absorber for a motor vehicle spring; and Fig. 4 is a diagrammatic view showing the device employed as a shock absorber for a motor vehicle steering gear.

Figure 1:
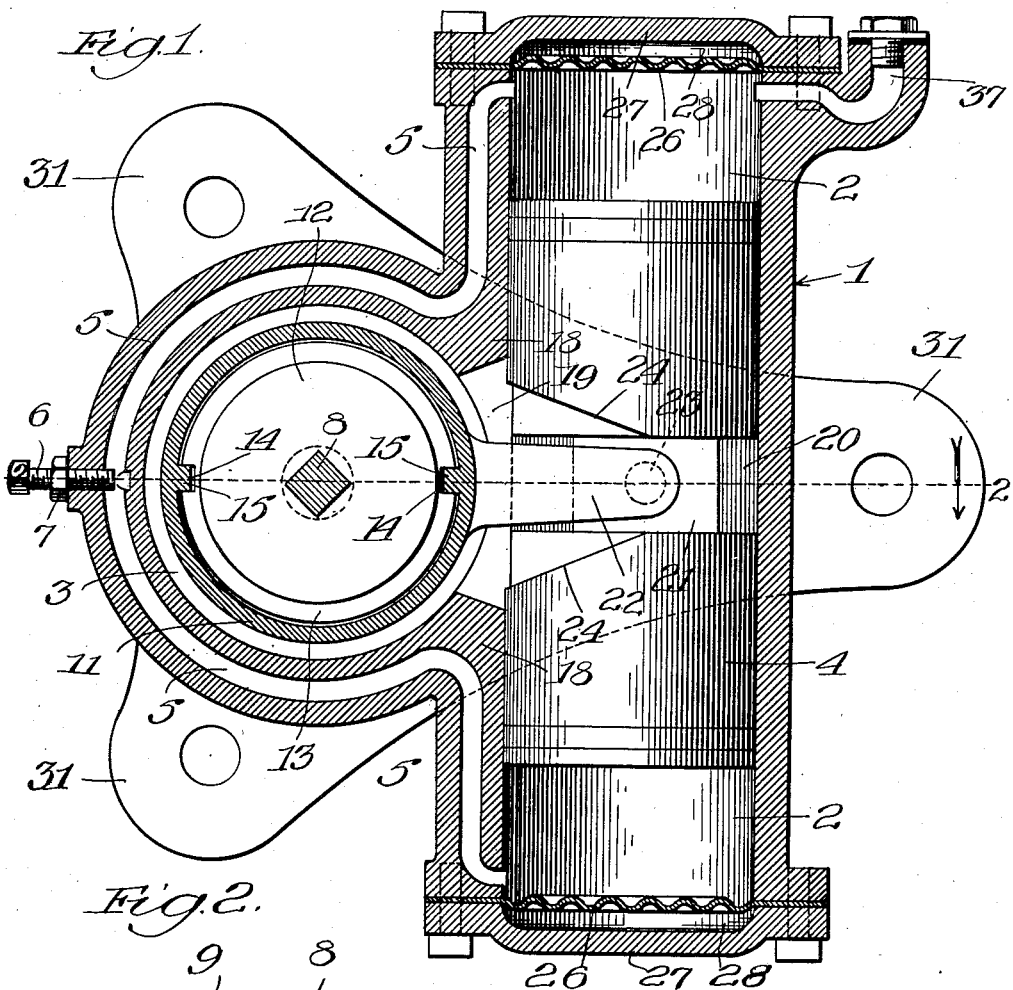
Fig. 1 is a vertical sectional view through a shock absorbing mechanism constructed in accordance with my invention.

The mechanism of my invention comprises an outer casing 1, preferably in the form of a casting formed to provide a cylinder 2 and a chamber 3, the latter being at one side of the cylinder and preferably located between its ends. A piston 4 is slidably mounted in the cylinder 2 and is shorter than the cylinder so as to provide spaces for liquid, such as oil, at the opposite ends of the cylinder. These ends are connected by a conduit 5 into which extends a screw 6 for regulating the flow of oil from one end of the cylinder to the other in the movement of the piston 4. The screw 6 is provided with a jam nut 7 on the outside of the casing 1 whereby the screw may be set in any of its adjusted positions.

Figure 2:
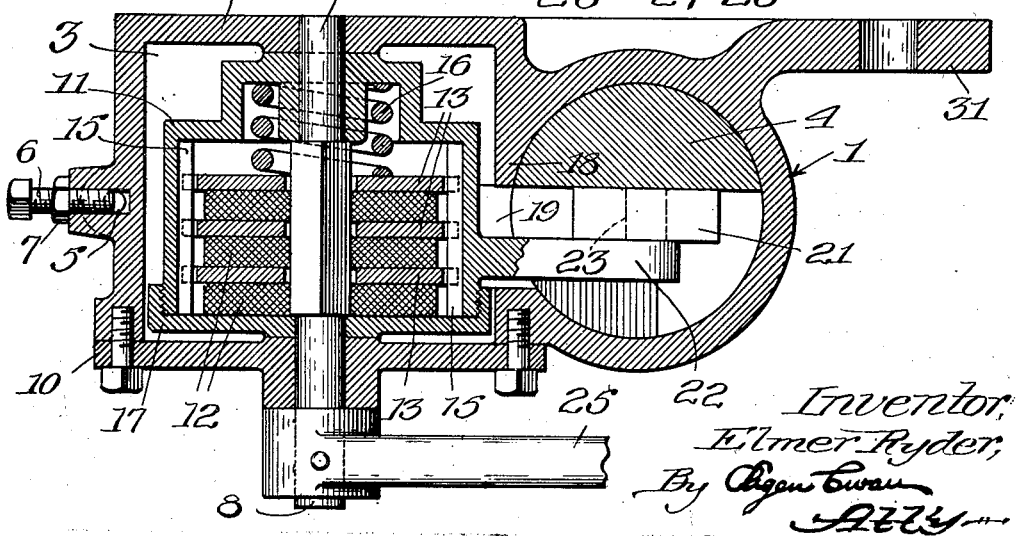
Fig. 2 is a horizontal sectional view taken on line 2—2 of Fig. 1.

Extending centrally through the chamber 3 at right-angles to the movement of the piston 4 is a shaft 8 having its ends journaled in the side walls 9, 10 of said chamber. The side wall 10 may be made in the form of a cover plate, which is removably secured in place by a number of screws, as shown. A housing 11 is located in the chamber 3 and is loosely mounted on the shaft 8, as shown in Fig. 2. Located in this housing are a plurality of friction discs 12, 13 arranged in sets with the discs in one set alternating with those of the other, as shown in Fig. 2. The discs 12 of one set are fixed to the shaft 8 so as to rotate therewith. This may be accomplished by having square or flat sided bores at the centers of the discs to fit a complementary shaped portion of the shaft where it extends through the discs. The discs 13 of the other set are fastened at their outer peripheries to the housing 11 so as to turn therewith. This may be accomplished by providing the outer peripheries of the discs with one or more notches 14, 14 and into which notches extend keys 15 carried by the housing on the inside thereof, as shown in Fig. 2. The bores at the centers of the discs 13 are made much larger than the shaft 8 so that the discs 13 may turn with respect to said shaft. (See dotted line, Fig. 1.) The discs are yieldably held in tight contact with each other by means of a coiled spring 16 located in the housing at one end and bearing against the associated assembly of discs, as shown in Fig. 2. The opposite end of the housing may be made in the form of a removable cover 17 so as to facilitate assembly.

The wall 18 which divides the cylinder 2 from the chamber 3 is provided with an elongated slot 19 arranged parallel to the movement of the piston 4. The latter is made long enough to close the slot in all positions of the piston. The mid portion of the piston is partially cut away from one side to provide a horizontally disposed cross slot 20 in which works a block 21 having sliding contact with the upper and lower surfaces of said cross-slot. The housing 11 is provided between its ends with an arm 22 preferably integral therewith and extending laterally therefrom into the cross-slot 20 through the vertical slot 19. The outer end of the arm 22 overlaps the outer side of the block 21 and is connected therewith by a pivot pin or stud 23 so that the housing will turn in the endwise movement of the piston. Portions of the cross-slot 20 above and below the arm 22 are angularly cut away, as at 24, 24, to allow for free swinging movements of the arm.

Exterior of the casing 1 is a main operating arm 25 having one end fixed to the shaft 8, as shown in Fig. 2.

Flexible diaphragms 26, 26 are arranged over the opposite ends of the cylinder 2 and are clamped in place by the cylinder heads 27, 27. These heads are so formed as to provide air confining chambers 28, 28 between the diaphragms and their respective cylinder heads so as to provide air cushions at the opposite ends of the cylinder and thus permit the piston 4 to have a slight free floating movement, the purpose of which will presently appear. The diaphragms 26 are preferably made of light gauge metal and corrugated concentrically so as to flex more easily and thus be rendered more sensitive than should plain diaphragms be employed.

In Fig. 3, I have shown the device of my invention applied to a vehicle for absorbing the shocks of the vehicle springs. When so used, the casing 1 is suitably secured to the vehicle frame 29 above one of the axles 30. For this purpose, the casing 1 is provided with a number of apertured ears or lugs 31, 31, through which bolts 32 are inserted for securing the casing to the vehicle frame. The outer end of the arm 25 is connected to the axle 30 by a rigid link or rod 33. The opposite ends of this rod are flexibly connected with the arm 25 and axle 30, respectively, by sections 34, 34 of flexible webbing or like material so as to obtain a structure which is cheap to manufacture and install and requires no lubricating or other attention after being applied in place.

The mechanism so installed operates as follows: Under the ordinary small shocks to which the vehicle is subjected when traveling over a relatively smooth and even roadway, the piston 4, by reason of the air cushions at the opposite ends of the cylinder 2, is permitted to have a slight back and forth free movement without throwing into action the rest of the device. When the axle 30 is moved upward by the wheels going over a bump in the roadway, the arm 25 is raised upward and turns the housing 11 through the friction discs 12, 13 and moves the piston 4 upward. This causes an upward pressure to be exerted on the liquid in the upper end of the cylinder, with the result that some of this liquid is forced into the lower end of the cylinder through the by-pass 5 the rate of flow being maintained relatively slow by the valve 6. This flow is relatively slow as determined by the position of the valve so that the piston will not move quickly and thus permit the shock to be absorbed by the liquid and be dissipated before reaching the vehicle frame. In the downward movement of the axle 30 on the recoil of the vehicle spring, a reverse action takes place, namely, the piston moves downward and forces a small portion of the oil through the by-pass 5 into the upper end of the cylinder. As the movement of the piston is maintained relatively slow, the shock of the recoil is also absorbed and dissipated.

Under a heavy or violent shock, as would occur should the wheels drop into a relatively deep hole or ride over a relatively high bump or obstruction, the friction discs 12, 13 slip with respect to each other and permit the shaft 8 to turn without imparting any rotary movement to the housing 11, and thus no motion is imparted to the piston 4. These discs are pressed tightly enough together so as to resist this rotary movement and thus throw the absorbing of the shock on the discs without depending on any action of the piston 4 in the cylinder to do the work. Thus the slow action of the hydraulic part of the mechanism is not depended on to absorb or dampen these more violent shocks. The friction discs function in both directions, and thus make the friction part of the mechanism operative to absorb shocks in both directions.

When the mechanism of my invention is used with the steering gear of the vehicle to absorb the lateral shocks to which the wheels are subjected as they travel over a roadway, the casing 1 is applied to the front axle 35 in a generally horizontal position, and the arm 25 is connected with the tie-rod 36 of the steering apparatus, as shown in Fig. 4. As the device is double acting, the lateral movements of the wheels are compensated for and the shocks absorbed without transmitting them to the steering wheel at the hands of the operator. Should the driver decide to make a quick turn either to the right or to the left, the friction discs 12, 13 will slip so that the turn could be made without any hindrance being offered by the slow motion piston 4 in the hydraulic cylinder 2. This is a decided advantage of the invention because with a straight hydraulic job the slow movement afforded would not permit quick turns to be made.

By arranging the friction discs 12, 13 closely adjacent to the cylinder 2 in the manner shown and described, the heat generated by the slippage of the discs with respect to each other will serve to warm the liquid in the cylinder and thus serve to maintain it in a free flowing state especially in cold weather when the tendency of such liquid is to congeal and become slow moving. As an aid to further keeping the liquid warm, the duct 5 is arranged to partially encircle the disc assembly, as shown in Fig. 1. This duct is preferably cored in the casing 1 at the time of casting the same.

The cylinder 2 is provided at its upper end with a filling passage 37 through which the cylinder may be filled with liquid. When the mechanism is first assembled, the arm 25 is actuated so as to move the piston 4 to the end of the cylinder 2 opposite the filling passage 37, whereupon the oil or other liquid employed is poured into the cylinder. After filling the device, the arm 25 is then raised to bring the piston 2 to its mid portion, and the excess amount of oil in the end of the cylinder at the filling neck is forced into the opposite end of the cylinder and the device ready for use.

The details of construction and arrangement of parts may be variously changed and modified without departing from the spirit and scope of my invention.

I claim as my invention:

1. In a shock absorbing mechanism, the combination of hydraulic means for absorbing light shocks, and friction means operable independently of the hydraulic means for absorbing those shocks which can not be quickly compensated for by the hydraulic means.

2. In a shock absorbing mechanism, the combination of hydraulic means for absorbing light shocks, and friction means operable independently of the hydraulic means for absorbing those shocks which can not be quickly compensated for by the hydraulic means, said hydraulic means being so located with respect to the friction means that the heat generated in the operation of the friction operated means will serve to heat the hydraulic means and thus serve to maintain the latter in a condition for ready operation.

3. In a shock absorbing mechanism, a casing having a chamber and a hydraulic cylinder, a piston operable in the cylinder, means providing a by-pass for the restricted flow of fluid from one side of the piston to the other, and a friction clutch in the chamber connected with the piston in a manner to absorb those shocks which can not be quickly compensated for by the movement of the piston in said cylinder.

4. In a shock absorbing mechanism, a casing having a chamber and a hydraulic cylinder, a piston operable in the cylinder, means providing a by-pass for the restricted flow of fluid from one side of the piston to the other, a friction clutch in said chamber and having a housing with a multiplicity of spring pressed friction discs therein, a connection between the housing and the piston for turning the housing by the piston, and a shaft extending through the housing and discs, said discs being arranged in two sets which are fixed to the housing and shaft, respectively.

5. In a shock absorbing mechanism, a casing having a chamber and a hydraulic cylinder, a piston operable in the cylinder, a conduit providing a by-pass for the restricted flow of fluid from one side of the piston to the other, a shaft journaled in said chamber, a friction clutch in said chamber and having a housing rotatably mounted on said shaft, a multiplicity of spring pressed friction discs located in the housing about the shaft and arranged in two sets with one set fixed to the shaft and the other set fixed to the housing, and two arms, one exterior of the casing and fixed to said shaft and the other inside of the casing and connecting the housing to the piston so as to be turned thereby.

6. In a shock absorbing mechanism, a casing having a chamber and a hydraulic cylinder, a piston in said cylinder, a conduit connecting one end of the cylinder to the other, a shaft journaled in said chamber, a housing rotatably mounted on said shaft and having an arm extending toward the piston, a block slidably mounted in a cut away portion of the piston and pivotally connected to the outer end of said arm, and spring pressed friction discs in the housing about said shaft and arranged in sets with one set fixed to the shaft to turn therewith and the other set keyed to the housing for rotation therewith, and a main operating arm secured to the shaft on the outside of the casing.

7. In a shock absorbing mechanism, a casing having a hydraulic cylinder and a chamber, the latter being arranged at one side of the cylinder and between the ends thereof, a piston movable in the cylinder, a friction clutch located in said chamber and connected with the piston, a main operating arm connected with the piston through said clutch, and a by-pass conduit connecting the opposite ends of the cylinder, said conduit having a portion closely adjacent the friction clutch so as to be within the influence of the heat generated by the clutch in the operation thereof.

8. In a shock absorbing mechanism, a casing having a hydraulic cylinder and a chamber, the latter being arranged at one side of the cylinder and between the ends thereof, a piston movable in the cylinder, a friction clutch located in the chamber and connected with said piston, a main operating arm connected to the piston through said clutch, and a by-pass conduit formed in the casing and connecting one end of the cylinder to the other, said conduit having a portion partially encircling the chamber containing the clutch so as to be within the influence of the heat generated by the clutch in the operation thereof.

3. In a shock absorbing mechanism, a casing having a hydraulic cylinder and a chamber, a piston movable in said cylinder, a friction clutch located in the chamber and connected with the piston, a main operating arm connected with the piston through said clutch, and means at the opposite ends of the cylinder providing resilient cushions allowing the piston to have a free movement back and forth within limits when the piston is at a central or mid position in the cylinder without making active either the hydraulic or the friction part of the mechanism.

10. In a shock absorbing mechanism, a casing having a chamber and a hydraulic cylinder, a piston operable in said cylinder, a by-pass connection for the liquid from one side of the piston to the other, a friction clutch in the chamber and connected with the piston, a main operating arm connected to the piston through the clutch, flexible diaphragms over the opposite ends of the cylinder, and cylinder heads closing the opposite ends of the cylinder over said diaphragms and being formed to provide air confining spaces between the heads and the diaphragms.

11. In a shock absorbing mechanism, a casing having a hydraulic cylinder and a chamber at one side of the cylinder and between the ends thereof with an elongated slot in the wall dividing the cylinder from the chamber, a piston in the cylinder, a friction clutch including a rotatably mounted housing in said chamber, an arm secured to the housing and extending outward therefrom toward the piston through said slot, means at the outer end of the arm providing a pivotal connection therefor with the piston, and a main operating lever on the outside of the casing and connected with the piston through the friction clutch.

In testimony whereof I affix my signature.

ELMER RYDER.